（12） United States Patent
Sorenson, III

(10) Patent No.: US 10,003,527 B1
(45) Date of Patent: Jun. 19, 2018

(54) DEVICES AND METHODS TO ASSIST WITH NETWORK CABLING

(75) Inventor: James Christopher Sorenson, III, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 365 days.

(21) Appl. No.: 13/359,132

(22) Filed: Jan. 26, 2012

(51) Int. Cl.
*G01R 31/08* (2006.01)
*H04L 12/703* (2013.01)

(52) U.S. Cl.
CPC .................................. *H04L 45/28* (2013.01)

(58) Field of Classification Search
USPC ................................. 370/241, 244, 254, 401
See application file for complete search history.

(56) References Cited

U.S. PATENT DOCUMENTS

| | | | | |
|---|---|---|---|---|
| 6,895,594 B1 * | 5/2005 | Simoes et al. | ................ | 725/127 |
| 8,340,093 B2 * | 12/2012 | Shifris et al. | ................ | 370/389 |
| 2008/0049627 A1 * | 2/2008 | Nordin | ......................... | 370/241 |

OTHER PUBLICATIONS

S Charles Clos—A Study of Non-Blocking Switching Network (Manuscript received Oct. 30, 1952).*

* cited by examiner

*Primary Examiner* — Yemane Mesfin
*Assistant Examiner* — Henry Baron
(74) *Attorney, Agent, or Firm* — Hogan Lovells US LLP

(57) ABSTRACT

A device is described for assisting network technicians and other users with network cabling. The device can be provided to a technician, where the technician plugs a loose cable end into the device, and if the other end of the cable is attached to a switch (e.g. Euclid switch), the device indicates to the technician via a display where on the network the cable should be plugged in (which port on which switch). When the device is connected to a switch via a cable, the switch can make available its information to the device. The device can also consult a data store to determine where the other end should be attached. The information that is used to determine where the cable should be attached can include the number of layers in the network; the number of switches in each layer; and the number of ports on the switches.

16 Claims, 5 Drawing Sheets

DEVICES AND METHODS TO ASSIST WITH NETWORK CABLING

BACKGROUND

While wireless connectivity is becoming more and more prevalent, many networks today still utilize cables to transfer signals and information from one resource to another. In large networking environments, the management of wires and cables to various switches can become a quite complex task due to the number of devices and ports involved. For example, a large data center may have thousands of cables running between the various devices. If one or more of those cables becomes unplugged, it can be difficult to determine which port and device that cable was originally connected to. Furthermore, when adding new devices to the network, it is not always readily apparent to a technician how those new devices should be wired into the existing network elements.

One conventional way to address some of the issues in network cabling is to create a cut sheet that specifies how each resource in the network is connected to other resources. The cut sheet can be entered into a computer or database, which can be subsequently used to automatically determine where a device or wire should be connected to. However, due to the large number of devices and cables involved, creating a cut sheet can be a tedious task, requiring specialized knowledge and expertise. In addition, because cut sheets are typically created by network architects or technicians, they can be quite prone to human error.

BRIEF DESCRIPTION OF THE DRAWINGS

Various embodiments in accordance with the present disclosure will be described with reference to the drawings, in which.

DETAILED DESCRIPTION

Figure 1:
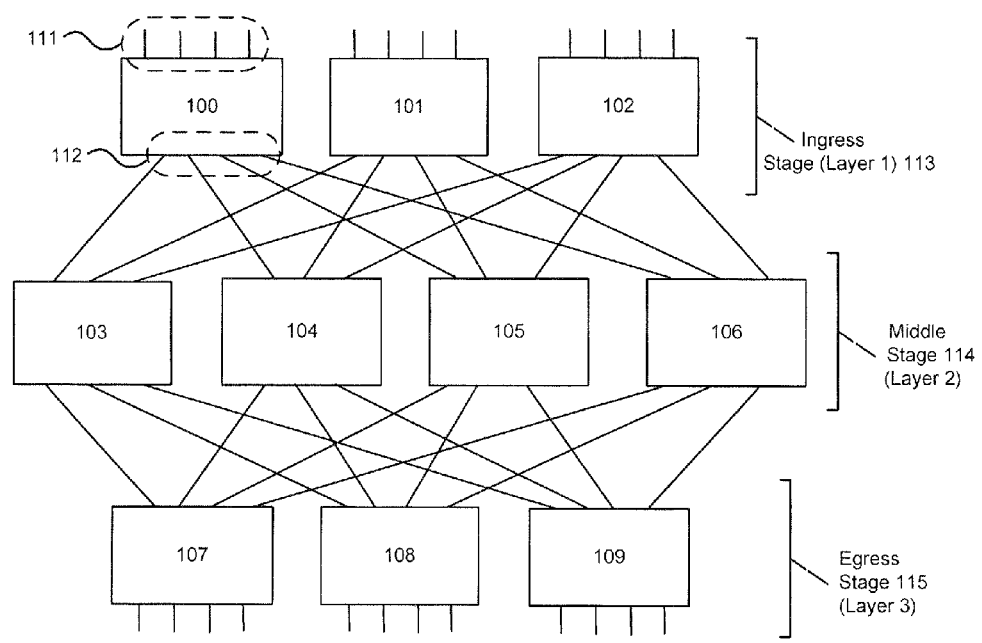
FIG. 1 illustrates an example of a Clos network that can utilize the device to assist with network cabling, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments overcome the aforementioned and other deficiencies in existing approaches for connecting groups of electronic devices. In particular, various embodiments provide approaches for assisting network administrators and other persons to determine the appropriate port and switch locations for loose wires and cables in a network environment.

Certain types of networks are very regularly organized such that the network topology itself indicates which port on which switch should be connected to which other port on another switch. The Euclid network is an example of such a regularly organized network where the cabling between switches is set up in such a way that one can know with relative certainty which port on a switch needs to be connected to which other port on another switch. This is unlike typical ad hoc networks where humans make decisions about port allocations such as by plugging a cable into the next available open port on the switch or router. It should be noted that the term "cable" as used throughout this disclosure is meant to include any type of wire or cable that is capable of connecting two or more components, including but not limited to fiber optic cables, Registered Jack (RJ) cables (e.g. RJ11, RJ14, RJ45, RJ48, etc.), metal wires (e.g. copper, aluminum, nickel, steel, platinum, gold, silver, etc.) and the like.

In accordance with various embodiments, described herein, the regularity of certain network topologies, such as the Euclid or Clos network, can be used to assist data technicians in determining where cables should be plugged in. For example, in a Euclid network, a Euclid switch on the edge of the network has half of its port going to other switches, while a Euclid switch in the middle of the network has all of its ports connected to other Euclid switches. This implies that most of the connections in a Euclid network are determined.

In accordance with various embodiments, a device is provided to a technician, where the technician plugs a loose cable end into the device, and if the other end of the cable is attached to a switch (e.g. a Euclid switch), the device indicates to the technician via a display where the cable should be plugged in (which port on which switch).

In accordance with an embodiment, when the device is connected to a switch via a cable, the switch makes available its information to the device. The device can consult a data store to determine where the other end should be attached. Various protocols can be used to communicate the port information between the switch and the device as known in the art.

In accordance with an embodiment, the information that can be used by the device to determine where the cable should be plugged into includes at least the following parameters: (1) how many layers (stages) are in the Clos network; (2) how many switches are in each layer; and (3) how many ports are in the switches. In addition, if one switch has information about its location (position) on the network, it can provide this information to the device. For example, the device can obtain information from the switch regarding which position in which layer of the clos network that switch is located in and which port on the switch the cable is connected to.

This and other such information can then be used by the device to compute the appropriate location for a loose cable to be plugged into based on the topology of the network. For example, the device may be informed that the other end of a particular wire is connected to the third port of the second switch located at layer two of the clos, and then depending on the network parameters mentioned above, the device may determine that the wire should be plugged into the third switch of the third layer of the Clos network.

FIG. 1 illustrates an example of a Clos network that can utilize the device to assist with network cabling, in accordance with various embodiments. As illustrated, a Clos network is a multistage switching network which is usually comprised of a plurality of switches (100-109) arranged in a number of stages or layers. FIG. 1 shows an example of a three stage clos network, including an ingress stage 113 containing three switches (100, 101, 102); a middle stage containing four switches (103, 104, 105, 106); and an egress stage containing three switches (107, 108, 109). Each of the switches further contains a number of ports (connections 111, 112) that connect the switch to other switches in the network or to external components.

One characteristic of a clos network illustrated in FIG. 1 is that a switch on the edge (outer layer) of the clos network has half of its ports going to other switches, while a switch in the middle layer of the clos network has all of its ports connected to other switches (half of the switches being connected to each adjacent layer). For example, each switch in the ingress layer 113 has eight ports, with four of the ports being connected to external components and the other four being connected to switches in the adjacent layer (114) of the network. Similarly, each switch in the middle layer 114 has six ports, where three of those ports are connected to the three switches in the ingress layer 113 and the other three ports are connected to the three switches in the egress layer 115.

This characteristic of the network can be used to determine with certainty which cable should be plugged into which port/switch by using relatively few input parameters. For example, by knowing the number of layers in the clos network, the number of switches at each layer and the number of ports on the switches, it can be deduced which port should be connected to which other port on the network.

Figure 2:
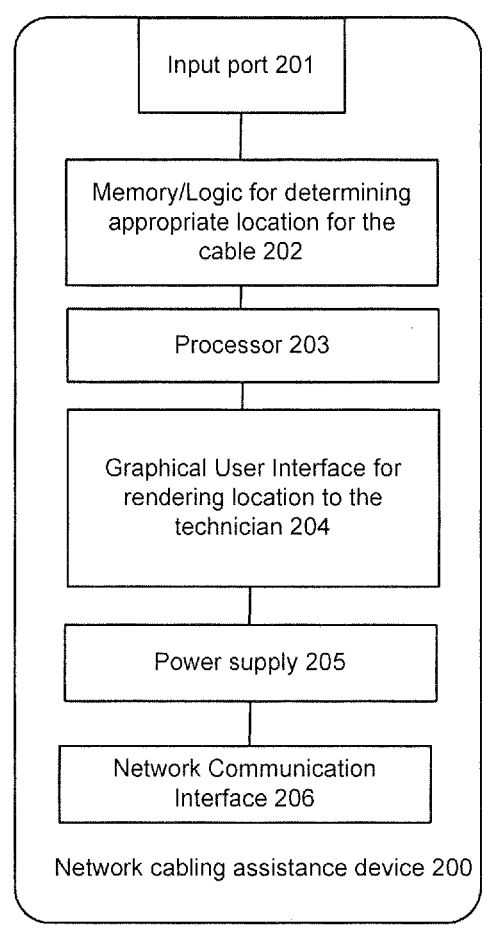
FIG. 2 illustrates an example of a device that can be used to assist with network cabling in accordance with various embodiments.

FIG. 2 illustrates an example of a device that can be used to assist with network cabling in accordance with various embodiments. As illustrated, the device 200 for assisting with network cabling can include a port 201 for connecting the device to a loose cable that is connected on the other end to a switch in a network. The device can also include a storage memory 202 containing a set of instructions and a processor 203 that can execute those instructions in order to determine the location on the network that the cable should be plugged into.

When the device detects that a cable has been connected to port 201, the device can establish a connection with the switch on the other end of the cable and obtain information from the switch regarding the positioning of that switch on the network. For example, the device can query the switch and determine that the cable is plugged into the second port on the third switch on layer two of the clos network. The communication between the device and the switch can be performed using any discovery protocol that enables devices directly connected with each other to discover information about each other. Some examples of such protocols include the Cisco® Discover Protocol (CDP) and Link Layer Discovery Protocol (LLDP). It should be noted that the embodiments described herein are not limited to any single such protocol or means of interaction between devices.

In addition, the network cabling assistant device can be provided with network configuration information, such as the number of layers in the network, number of switches at each layer and the number of ports on each switch. In accordance with various embodiments, the network configuration information can be pre-loaded on the device, manually entered on the device or obtained by communicating with a network resource such as a switch. Based on all of this information, the device can compute a location in the network that the cable should be plugged into in order to satisfy the network topology.

The device can further include an interface 204 that renders information regarding the determined location on the network that the cable should be plugged into. In accordance with an embodiment, the interface can be a simple display screen that displays to the user information identifying the port, switch and layer of the network that the cable should be connected to. In accordance with various alternative embodiments, the interface can also be an audio interface that provides auditory instructions to the user, one or more light emitting diodes (LEDs) that provide information to the user, a vibrating mechanism to notify the user and others.

In addition, the device can optionally include a power supply 205 such as a battery. Alternatively, the power can be supplied to the device on the input 201 port via a cable.

In accordance with an embodiment, the device 200 can optionally include a network interface 206 that can be used to communicate information to a remote device that can in turn provide that information to the user or utilize it in some other manner. For example, the network interface can be an application programming interface (API) that can communicate the determined location for the cable to a remote device (e.g. a display console, wrist watch, cellular telephone, etc.) that can in turn display that information to the user.

Figure 3A:
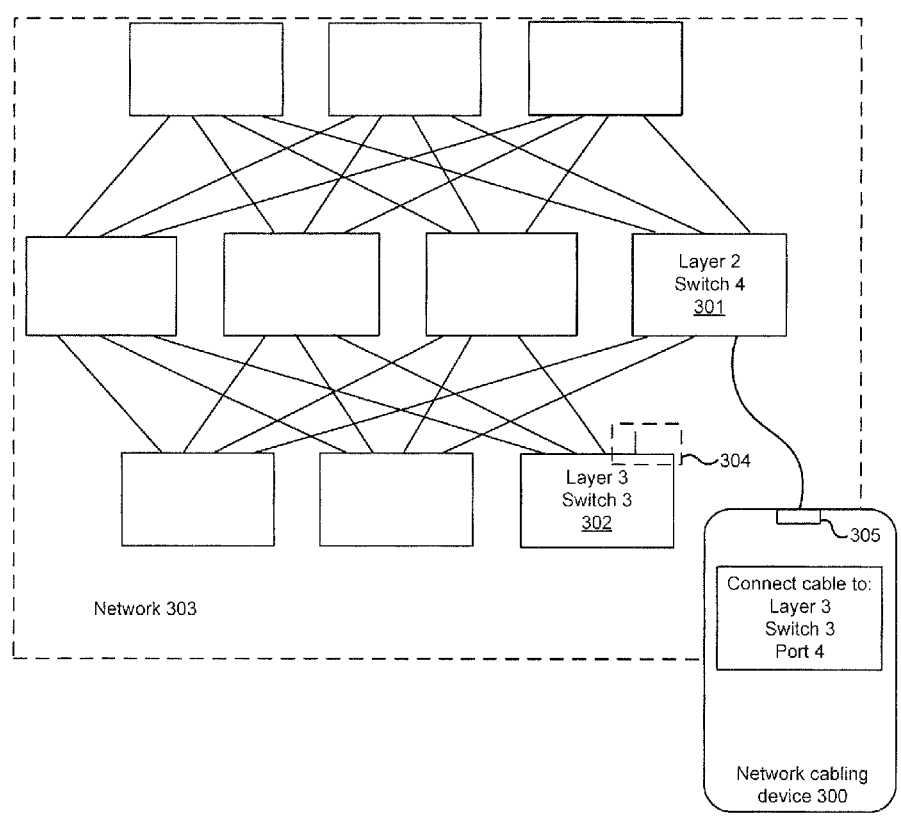
FIG. 3A illustrates an example of using a device to assist with network cabling in accordance with various embodiments.

FIG. 3A illustrates an example of using a device to assist with network cabling in accordance with various embodiments. The device 300 is used with network 303, which is similar to the Clos network illustrated in FIG. 1. As illustrated, the technician may find a cable connected to switch 301 and connect the loose end of the cable to a port 305 on the network cabling assistant device 300.

Once the device is connected, it can query switch 301 for its position (location) on the network. In addition, the device can have access to the various parameters of the network, such as the number of layers, switches and ports, as previously described. When the device obtains the location information from the switch, it can use that information to determine which port 304 on the network the cable should be plugged into.

By way of example, in this particular illustration, the network is a three layer network, the first layer having three switches each switch having eight ports, the second layer having four switches, each switch having six ports, and the third layer having three switches, each switch having eight ports. Because the device can determine that the cable is connected to the last port of the fourth switch (301) in the middle layer, and because the network configuration specifies that there are three switches in the egress layer, the device can use this information to determine and display to the user that the cable should be connected to port 4 on the switch 3 (302) in layer 3 of the network. It should be noted that the numbering of ports and switches in the various figures shown here have been simplified for purposes of clarity and that in actuality, the ports and switches can be identified using more specific identifiers, such as their network addresses, device numbers or other unique IDs.

Figure 3B:
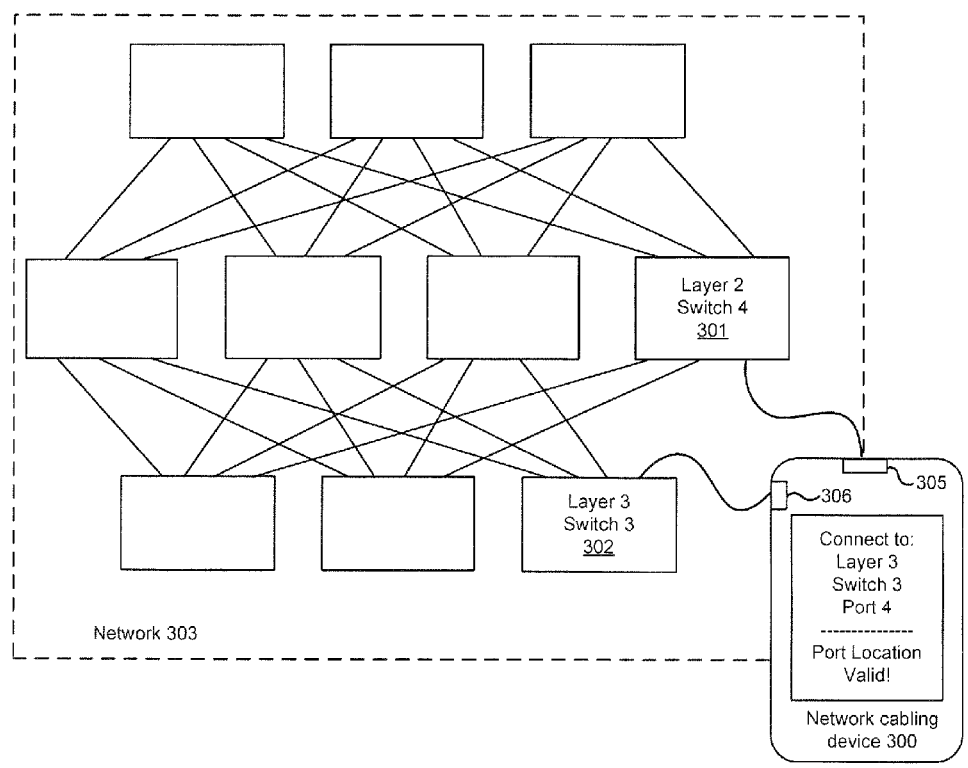
FIG. 3B illustrates an alternative example of using a device to assist with network cabling in accordance with various embodiments.

FIG. 3B illustrates an alternative example of using a device to assist with network cabling in accordance with various embodiments. In this figure, similarly to the illustration in FIG. 3A, the device is connected to loose cable that is connected to device 301. However, in this illustration, the device 300 also includes a second port 306 with a test cable that can be used to verify the location in the network where the original cable should be plugged into. For example, if a network technician plugs in a loose end of the cable that is connected to device 301, the device can display to the technician that this end of the cable should be plugged into port 4 located on switch 3 302 in layer 3 of the network. The technician can then use that information and connect the test cable of port 306 to the port where the technician believes to be the proper location. In accordance with an embodiment, the device 300 can then verify whether the port of the device connected to the test cable is indeed the valid port that was determined by the device. It should be noted that while in FIG. 3B, the device simply confirms that the tested port is indeed the valid port for the loose cable, in alternative embodiments, the device can instead use the test cable to provide more detailed information to the technician, such as the location information for the wire that belongs in the tested port. In addition, the port can also be validated various other means, such as providing an LED light of a particular color to indicate a valid/invalid port, vibrating mechanisms or audio signals, as previously described.

Figure 4:
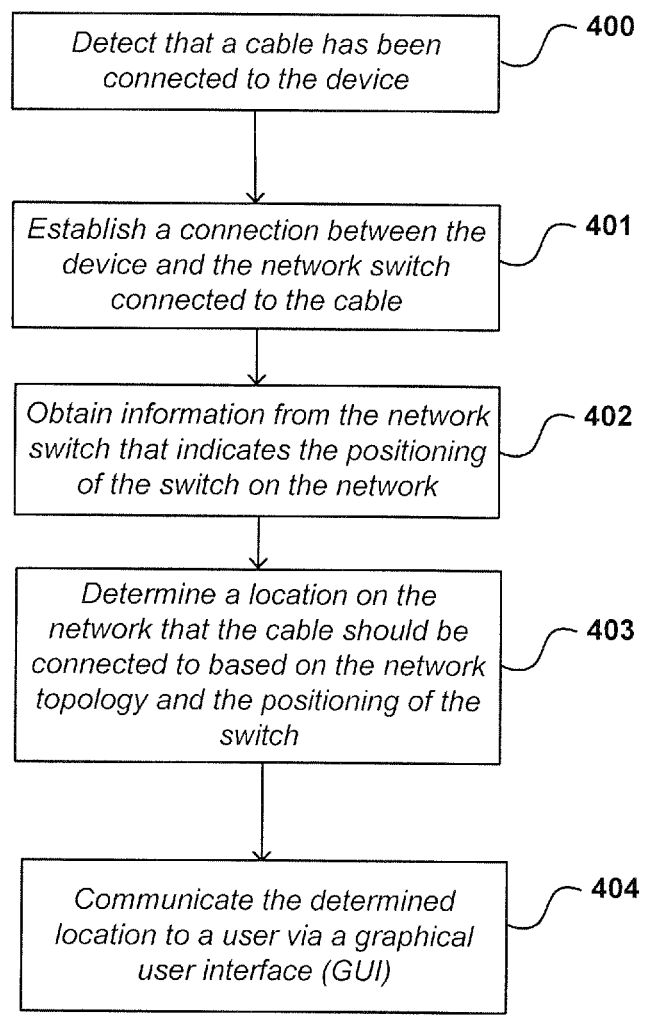
FIG. 4 illustrates an example process that can be used by the device for assisting with network cabling, in accordance with various embodiments.

FIG. 4 illustrates an example process that can be used by the device for assisting with network cabling, in accordance with various embodiments. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the scope of the various embodiments.

As shown in step 400, the device can detect that a cable has been connected to the port. This can include, for example, a technician plugging a loose end of a network cable into the device. Alternatively, the technician may plug a test cable of the device into an open port on a network switch. In step 401, the device establishes a connection with the switch on the other end of the cable. This can be performed using a device discovery protocol, such as CDP or LLDP.

In step 402, the device obtains information from the switch regarding its position in the network. For example, the device can obtain information about the position and layer of the clos in which the switch is located, as well as the port on the switch to which the cable is connected. As discussed, if the network is an irregular network or has a different topology, other information might be utilized as well. Based on this information as well as any network configuration information, the device can determine a location on the network where the cable should be connected, in order to satisfy the topology of the network (step 403). For example, the device can identify a port on a particular switch in a particular layer of the network that the cable should be plugged into. Once the location is determined, the device can display information about location using a display screen, as shown in step 404.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl®, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A device for assisting with network cabling, the device comprising:
    a device processor;
    a port;
    a display screen; and
    a storage memory containing instructions that, when executed by the device processor, cause the device to:
        establish communication with a switch in a network over a network cable upon connecting a first end of the network cable to the port of the device, a second end of the network cable being connected to the switch in the network;
        obtain information from the switch including at least a number of layers in the network, a number of switches in each layer of the network, and a number of ports in each switch in the network;
        calculate a topology of the network and a location of the switch within the topology of the network, based at least in part on the information obtained from the switch;
        determine a different location in the network where the first end of the cable should be connected to satisfy the topology of the network, the determining being based at least in part on the topology of the network and the obtained information regarding the location of the switch, the different location in the network where the first end of the cable should be connected being a different port than where the first or second ends of the cable are currently connected; and
        display information on the display screen indicating the determined location in the network where the first end of the cable should be connected.

2. The device of claim 1, wherein the network is a Clos network associated with network configuration information including (a) a number of layers in the Clos network, (b) a number of switches on each layer of the Clos network and (c) a number of ports on the switch in the Clos network.

3. The device of claim 2, wherein the storage memory further contains instructions that cause the device to compute the location where the first end of the cable should be connected in the Clos network based on the network configuration information and the information regarding the location of the switch.

4. The device of claim 1, wherein the determined location specifies a port address on a specified switch in a specified layer of the network that the first end of the cable should be plugged into in order to satisfy the network topology.

5. A device for assisting with network cabling, the device comprising:
    an input port for receiving a first end of a cable, a second end of the cable being connected to a network device;
    a hardware processor;
    storage memory containing instructions executable by the hardware processor to:
        calculate an optimized topology of a work based at least in part on information obtained from the network device including at least a number of layers in the network, a number of switches in each layer of the network, and a number of ports in each switch in the network; and
        determine a different location within the optimized topology of the network that the first end of the cable should be plugged into based on information associated with the network device connected to the second end of the cable, the different location in the network where the first end of the cable should be plugged into being a different port than where the first or second end of the cable is currently connected; and
    an interface that causes information about the determined location to be communicated to a user of the device,
    wherein the user of the device is able to connect the cable to the determined location based at least in part upon the info illation.

6. The device of claim 5, wherein the network is a Clos network associated with network configuration information that includes (a) a number of layers in the Clos network, (b) a number of switches on each layer of the Clos network and (c) a number of ports on at least one switch on the Clos network.

7. The device of claim 6, wherein the storage memory further contains instructions that cause the device to compute the determined location based on the network configuration information and the information associated with the network device.

8. The device of claim 5, wherein the determined location specifies a port address on a specified switch in a specified layer of the network that the first end of the cable should be plugged into.

9. The device of claim 5, wherein the storage memory further includes instructions for communicating with the network device over the cable and obtaining information from the network device that indicates a positioning of the network device on the network, wherein the information indicating the positioning of the network device is used by the device to compute the location that the first end of the cable should be plugged into.

10. The device of claim 5, further comprising:
    a second port; wherein the storage memory further includes instructions to verify the determined location by establishing a connection with a second network device over the second port.

11. A method for assisting with network cabling, the method comprising:

establishing a connection over a first end and a second end of a cable with a first device on a network, the second end of the cable connected to a first port of the first device;

calculating an optimized topology of the network based at least in part on information obtained from the first device including at least a number of layers in the network, a number of switches in each layer of the network, and a number of ports in each switch in the network;

obtaining information from the first device that specifies a positioning of the first device in the network;

determining a second port on a second device in the network to which the first end of the cable should be connected in order to enable the first port of the first device to communicate directly with the second port on the second device, the second port on the second device being determined based at least in part upon the calculated topology of the network and the obtained information that specifies the positioning of the first device on the network, wherein a respective port of a respective device that the second end of the cable is currently connected to is different than the second port on the second device that the first end of the cable should be connected to; and providing information regarding the second port and the second device for display to a user.

12. The method of claim 11, wherein the network is a Clos network associated with network configuration information that includes (a) a number of layers in the Clos network, (b) a number of switches on each layer of the Clos network and (c) a number of ports on at least one switch on the Clos network.

13. The method of claim 11, wherein the second device is a switch in a specified layer of the network topology.

14. A non-transitory computer readable storage medium storing one or more sequences of instructions executable by one or more processors to perform a set of steps comprising:

establishing a connection over a first end and a second end of a cable with a first device on a network, the second end of the cable connected to a first port of the first device;

calculating an optimized topology of the network based at least in part on information obtained from the first device including at least a number of layers in the network, a number of switches in each layer of the network, and a number of ports in each switch in the network;

obtaining information from the first device that specifies a positioning of the first device in the network;

determining a second port on a second device in the network to which the first end of the cable should be connected in order to enable the first port of the first device to communicate directly with the second port on the second device, the second port on the second device being determined based at least in part upon the calculated topology of the network and the obtained information that specifies the positioning of the first device on the network, where a respective port of a respective device that the second end of the cable is currently connected to being different than the second port on the second device that the first end of the cable should be connected; and providing information regarding the second port and the second device for display to a user.

15. The non-transitory computer readable storage medium of claim 14, wherein the network is a Clos network associated with network configuration information that includes (a) a number of layers in the Clos network, (b) a number of switches on each layer of the Clos network and (c) a number of ports on at least one switch on the Clos network.

16. The non-transitory computer readable storage medium of claim 14, wherein the second device is a switch in a specified layer of the network topology.

* * * * *

UNITED STATES PATENT AND TRADEMARK OFFICE
CERTIFICATE OF CORRECTION

PATENT NO. : 10,003,527 B1
APPLICATION NO. : 13/359132
DATED : June 19, 2018
INVENTOR(S) : James Christopher Sorenson It is certified that error appears in the above-identified patent and that said Letters Patent is hereby corrected as shown below:

In the Claims

The following Claims are hereby corrected as shown below:

1. A device for assisting with network cabling, the device comprising:
a device processor;
a port;
a display screen; and
a storage memory containing instructions that, when executed by the device processor, cause the device to:
establish communication with a switch in a network over a network cable upon connecting a first end of the network cable to the port of the device, a second end of the network cable being connected to the switch in the network;
obtain information from the switch;
calculate a topology of the network and a location of the switch within the topology of the network, based at least in part on the information obtained from the switch;
determine a different location in the network where the first end of the cable should be connected to satisfy the topology of the network, the determining being based at least in part on the topology of the network and the obtained information regarding the location of the switch, the different location in the network where the first end of the cable should be connected being a different port than where the first or second ends of the cable are currently connected; and
display information on the display screen indicating the determined location in the network where the first end of the cable should be connected.

2. The device of claim 1, wherein the network is a Clos network associated with network configuration information including (a) a number of layers in the Clos network, (b) a number of switches on each layer of the Clos network and (c) a number of ports on the switch in the Clos network.

3. The device of claim 2, wherein the storage memory further contains instructions that cause the device to compute the location where the first end of the cable should be connected in the Clos Signed and Sealed this
Twenty-eighth Day of May, 2019

Andrei Iancu
*Director of the United States Patent and Trademark Office* network based on the network configuration information and the information regarding the location of the switch.

4. The device of claim 1, wherein the determined location specifies a port address on a specified switch in a specified layer of the network that the first end of the cable should be plugged into in order to satisfy the network topology.

5. A device for assisting with network cabling, the device comprising:
an input port for receiving a first end of a cable, a second end of the cable being connected to a network device;
a hardware processor:
storage memory containing instructions executable by the hardware processor to:
calculate an optimized topology of a network; and
determine a different location within the optimized topology of the network that the first end of the cable should be plugged into based on information associated with the network device connected to the second end of the cable, the different location in the network where the first end of the cable should be plugged into being a different port than where the first or second end of the cable is currently connected; and
an interface that causes information about the determined location to be communicated to a user of the device, wherein the user of the device is able to connect the cable to the determined location based at least in part upon the information.

6. The device of claim 5, wherein the network is a Clos network associated with network configuration information that includes (a) a number of layers in the Clos network, (b) a number of switches on each layer of the Clos network and (c) a number of ports on at least one switch on the Clos network.

7. The device of claim 6, wherein the storage memory further contains instructions that cause the device to compute the determined location based on the network configuration information and the information associated with the network device.

8. The device of claim 5, wherein the determined location specifies a port address on a specified switch in a specified layer of the network that the first end of the cable should be plugged into.

9. The device of claim 5, wherein the storage memory further includes instructions for communicating with the network device over the cable and obtaining information from the network device that indicates a positioning of the network device on the network, wherein the information indicating the positioning of the network device is used by the device to compute the location that the first end of the cable should be plugged into.

10. The device of claim 5, further comprising:
a second port; wherein the storage memory further includes instructions to verify the determined location by establishing a connection with a second network device over the second port.

11. A method for assisting with network cabling, the method comprising:
calculating an optimized topology of a network;

establishing a connection over a first end and a second end of a cable with a first device on the network, the second end of the cable connected to a first port of the first device;
obtaining information from the first device that specifies a positioning of the first device in the network;
determining a second port on a second device in the network to which the first end of the cable should be connected in order to enable the first port of the first device to communicate directly with the second port on the second device, the second port on the second device being determined based at least in part upon the calculated topology of the network and the obtained information that specifies the positioning of the first device on the network, wherein a respective port of a respective device that the second end of the cable is currently connected to is different than the second port on the second device that the first end of the cable should be connected to; and
providing information regarding the second port and the second device for display to a user.

12. The method of claim 11, wherein the network is a Clos network associated with network configuration information that includes (a) a number of layers in the Clos network, (b) a number of switches on each layer of the Clos network and (c) a number of ports on at least one switch on the Clos network.

13. The method of claim 11, wherein the second device is a switch in a specified layer of the network topology.

14. A non-transitory computer readable storage medium storing one or more sequences of instructions executable by one or more processors to perform a set of steps comprising:
calculating an optimized topology of a network;
establishing a connection over a first end and a second end of a cable with a first device on the network, the second end of the cable connected to a first port of the first device;
obtaining information from the first device that specifies a positioning of the first device in the network;
determining a second port on a second device in the network to which the first end of the cable should be connected in order to enable the first port of the first device to communicate directly with the second port on the second device, the second port on the second device being determined based at least in part upon the calculated topology of the network and the obtained information that specifies the positioning of the first device on the network, where a respective port of a respective device that the second end of the cable is currently connected to being different than the second port on the second device that the first end of the cable should be connected; and
providing information regarding the second port and the second device for display to a user.

15. The non-transitory computer readable storage medium of claim 14, wherein the network is a Clos network associated with network configuration information that includes (a) a number of layers in the Clos network, (b) a number of switches on each layer of the Clos network and (c) a number of ports on at least one switch on the Clos network.

16. The non-transitory computer readable storage medium of claim 14, wherein the second device is a switch in a specified layer of the network topology.